O. L. DENNES.
VEHICLE SIGNAL.
APPLICATION FILED MAR. 27, 1922.
1,425,842.
Patented Aug. 15, 1922.
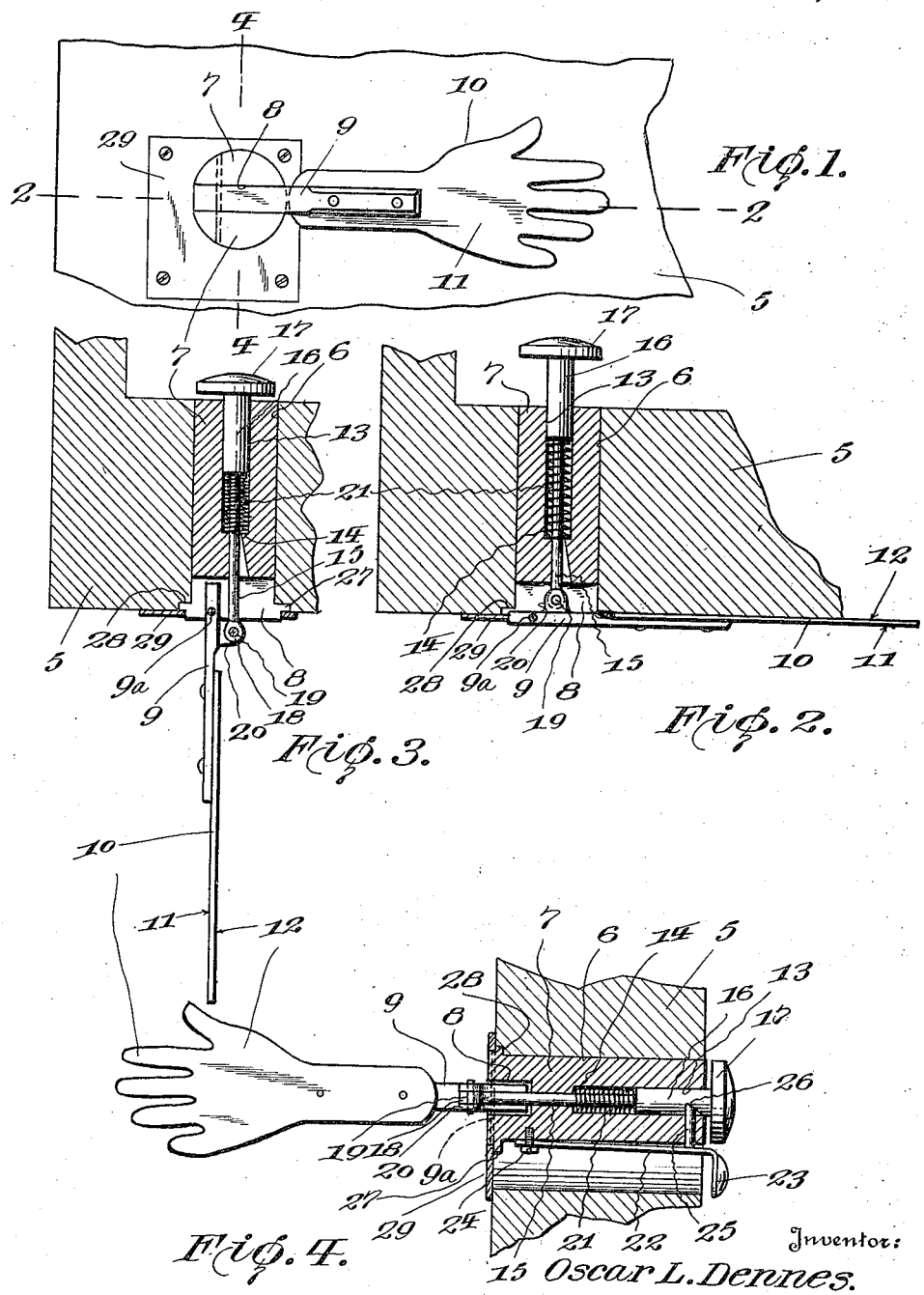
Inventor:
Oscar L. Dennes.
By Milo B. Stevens & Co.
Attorneys.

UNITED STATES PATENT OFFICE.

OSCAR L. DENNES, OF ARDMORE, OKLAHOMA.

VEHICLE SIGNAL.

1,425,842.  Specification of Letters Patent.  Patented Aug. 15, 1922.

Application filed March 27, 1922. Serial No. 547,056.

*To all whom it may concern:*

Be it known that I, OSCAR L. DENNES, a citizen of the United States, residing at Ardmore, in the county of Carter and State of Oklahoma, have invented new and useful Improvements in Vehicle Signals, of which the following is a specification.

My invention relates to semaphores or other signal devices used in connection with automobiles and other vehicles for indicating a change in the course or motion thereof.

An important object of the invention is the provision of a signal with means for releasably maintaining the same in signaling position when operated, in order that the driver may have both hands free for use in steering and controlling the car.

A further object of the invention is to furnish a signal device of this nature which will not detract from the neat appearance of the vehicle on which it is used, and which is of exceedingly simple, compact and inexpensive construction, such that the device can be readily mounted in proper position on the vehicle.

With these and other objects in view as will become more apparent as the description proceeds, the invention comprises a novel construction and arrangement of parts to be hereinafter described and claimed and in order that the same may be better understood, reference is had to the accompanying drawing, forming a part of this specification, and in which the preferred embodiment of the invention is disclosed.

In the drawing:

Figure 1 is an elevation showing my signal in closed position; Fig. 2 is a section on the line 2—2 of Fig. 1; Fig. 3 is a similar view showing the signal in operative position, and Fig. 4 is a section on the line 4—4 of Fig. 1, but showing the signal in operative position.

Referring specifically to the drawing, wherein like characters of reference designate like parts throughout the several views, the numeral 5 denotes a door or other wall portion of an automobile having a transverse opening 6 therein to receive a small cylinder 7, said cylinder having a transverse slot 8 across its outer end to form a bearing in which an arm 9 is pivotally mounted by means of a pin 9ª, extending transversely across said slot and through said arm. The arm 9 carries a signal hand 10, which is preferably of sheet metal with its outer face 11 painted the same color as the vehicle and with its inner or signaling face 12, painted red, so as to be readily discernible when in signaling position. The signal is adapted to be normally held flush against the door or wall 5, of the car, with its signal face 12, inward, by a means to be presently described.

Extending longitudinally through said cylinder 7, is a bore 13, formed intermediate its ends with a shoulder 14. This bore 13 is adapted to receive a link 15, on the inner end of which is keyed, threaded or otherwise secured, the shank 16 of a button 17, while the outer end of said link is formed with an eye 18, and is pivoted to the arm 8 by means of a pin 19, passing through said eye and the inwardly directed ears 20 of said arm 9.

From the foregoing it will be evident that by pressing the button 17, the arm 9, carrying the signal hand 10, will, by reason of its pivotal connection with said link 15, be swung from its position flush with the outer wall of the car to a position at right angles to said wall to display the red face 12 of said hand 10, as best shown in Fig. 3.

It is desirable that the signal be so constructed that it may be positively maintained in signaling position for a considerable period of time when a stop or turn is being made, and it is also equally desirable that it be readily returned to its non-signaling position without attention of the operator.

To this end, I have provided a coiled spring 21 in the bore 13, which encircles the link 15 between and abutting against the shoulder 14 and the end of the button shank 16. It will thus be noted that the spring 21 normally tends to hold the button 17 away from the inner end of the cylinder, thus retracting the link 15 and retaining the hand 10 against the wall 5. On the outside of said cylinder 7, I provide a spring metal strip 22 having at its inner end a thumb-piece 23, extending beyond the plane of the cylinder end. This strip 22 is secured at its outer end to the cylinder 7 by a screw 24, and carries near its inner end a stud 25, which is adapted to fit through an aperture in said cylinder to said bore and engage itself in a notch 26 in the button shank 16, when the same has been pushed inward to its fullest extent to place the hand 10 in display position. This stud 25 is held in said notch by the resiliency of strip 22 and effectually counteracts the tendency of the spring 21 to force the button shank 16 inwardly to withdraw the hand 10 from display position. When it is desired that the hand 10 be again returned to non-display position, the thumb-piece 23 is depressed to withdraw the stud 25 from the notch 26 to allow the return of the button shank 16 to place the hand 10 in non-display position.

The cylinder 7 is preferably formed with an integral collar 27, at its outer end, which is adapted to seat against a shoulder 28 in the opening 6, thus preventing recession of the cylinder too great a distance into said opening. An apertured plate 29 is adapted to be placed over the outer end of the opening and into the aperture of which the outer end of the cylinder fits. This plate 29 is screwed to the face of the door 5, and clamps against the outer side of the collar 27 to hold the cylinder in position.

From the foregoing description taken in connection with the accompanying drawing, the operation of the signal will be clearly understood. Installation of the same may be readily accomplished by drilling a hole in the door or other wall portion 5 and inserting the cylinder therein. The apertured plate 29 will effectually hold the cylinder in position. As will be seen, my construction embodies a compact arrangement whereby the working parts are encased in a cylinder or housing and are thus protected from the weather. The bearing of the arm 9, in slot 8, is so formed that when the signal is in inoperative position against the wall 5, the arm is flush with the outer end of the cylinder 7, thus rendering the whole device inconspicuous when in inoperative position. When it is desired to replace the spring 21, this may be readily accomplished by removal of the button 17.

While I have described the preferred embodiment of my invention, it will be understood that various changes and modifications may be made in the same within the spirit and scope of what is claimed hereinafter.

Having thus described my invention, I claim as new and desire to secure by Letters Patent:

1. In a vehicle signal, a casing having a transverse slot at one end thereof, a longitudinal bore therethrough and a circumferential shoulder within said bore adjacent said slot; a laterally swinging signal arm pivoted within said slot, said arm being movable to a position with its longitudinal edges flush with the end of said casing, a link formed with an abutment extending through said bore and pivoted to said arm, said abutment being intermediate the ends of said link, a coil spring encircling said link between said shoulder and said abutment for holding said link retracted to maintain said signal arm in position with its longitudinal edges flush with the outer edges of said slot.

2. In a vehicle signal, a casing having a transverse slot at one end thereof, a longitudinal bore therethrough and a circumferential shoulder within said bore adjacent said slot; a laterally swinging signal arm pivoted within said slot, said arm being movable to a position with its longitudinal edges flush with the end of said casing, a link extending through said bore and pivoted at one end to said arm, a shanked button removably carried upon the other end of said link, the shank of said button being movable into said bore, and a coil spring encircling said link with its ends abutting said shoulder and the inner end of said button shank for normally holding said link retracted to maintain said arm in position with its longitudinal edges flush with the outer edges of said slot.

3. In a vehicle signal, a casing having a longitudinal bore therethrough and a circumferential shoulder within said bore adjacent the outer end thereof, a laterally swinging signal arm pivotally carried at the outer end of said casing, a link extending through said bore and pivoted to said arm for operating the same, a shanked button carried upon the other end of said link, the shank of said button being movable into said bore and having a notch therein, a coil spring encircling said link with its ends abutting said shoulder and the inner end of said button shank for normally holding said link retracted to maintain said arm in non-signaling position, a spring-pressed stud carried by the outer face of said casing and extending transversely therethrough into the bore to engage the notch of said button shank when the same has been fully inserted to maintain said signal arm in signaling position, and means for disengaging said stud from said notch.

4. In a vehicle signal, the combination with a wall section of a vehicle having an opening therethrough; of a casing in said opening, said casing having a longitudinal bore therethrough and a transverse slot across its outer end; a shoulder intermediate the ends of said bore; a signal arm pivoted in said slot and adapted to be positioned flush against the wall of said vehicle; a link extending through said bore and pivotally connected at its outer end with said arm; a shanked button removably carried by the other end of said link and extending inwardly beyond the inner wall of the vehicle; a coiled spring encircling said link between said shoulder and said button shank and abutting thereagainst; and a clamping means for retaining said casing in said opening.

5. In a vehicle signal, the combination with a wall section of a vehicle having an opening therethrough; of a casing in said opening, said casing having a longitudinal bore therethrough and a transverse slot across its outer end; a shoulder intermediate the ends of said bore; a signal arm pivoted in said slot and adapted to be positioned flush against the wall of said vehicle; a link extending through said bore and pivotally connected at its outer end with said arm; a shanked button removably carried by the other end of said link and extending inwardly beyond the inner wall of the vehicle; a coiled spring encircling said link between said shoulder and said button shank and abutting thereagainst; a latch device associated with said cylinder for holding said signaling arm in display position; releasing means for said latch device; and a clamping means for retaining said casing in said opening.

In testimony whereof I affix my signature.

OSCAR L. DENNES.